(12) United States Patent
Hancock et al.

(10) Patent No.: US 6,397,263 B1
(45) Date of Patent: May 28, 2002

(54) STRING COMMAND PARSER FOR MESSAGE BASED SYSTEMS

(75) Inventors: Steven Marshall Hancock; David William Killian; Bradley Dale Noe; John Eugene Parsons, Jr., all of Boca Raton, FL (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 08/148,079

(22) Filed: Nov. 3, 1993

(51) Int. Cl.[7] .............................................. G06F 9/54
(52) U.S. Cl. ...................................................... 709/322
(58) Field of Search ................................. 395/700, 673, 395/674, 672; 364/DIG. 1, DIG. 2; 709/322

(56) References Cited

U.S. PATENT DOCUMENTS

| | | | | |
|---|---|---|---|---|
| 4,667,290 A | * | 5/1987 | Goss et al. ..................... | 717/7 |
| 4,712,189 A | * | 12/1987 | Mohri .............................. | 717/5 |
| 4,755,932 A | | 7/1988 | Diedrich .................. | 379/88.16 |
| 4,931,928 A | * | 6/1990 | Greenfeld ....................... | 717/8 |
| 5,020,021 A | * | 5/1991 | Kaji et al. ....................... | 304/5 |
| 5,095,432 A | | 3/1992 | Reed .............................. | 704/9 |
| 5,146,406 A | | 9/1992 | Jensen ........................... | 704/9 |
| 5,182,709 A | | 1/1993 | Makus ........................... | 704/9 |
| 5,193,192 A | | 3/1993 | Seberger ....................... | 717/9 |
| 5,201,050 A | * | 4/1993 | McKeeman et al. ........... | 717/7 |
| 5,208,745 A | | 5/1993 | Quentin et al. ................ | 700/83 |
| 5,321,607 A | * | 6/1994 | Fukumochi et al. ........... | 704/4 |
| 5,418,962 A | * | 5/1995 | Bodim et al. .................. | 710/8 |
| 5,459,867 A | * | 10/1995 | Adams et al. .............. | 709/321 |

OTHER PUBLICATIONS

Tremblay, et al; *AN Introductory Guide to Compiler Writing*; McGraw–Hill, Inc. ; 1985 ; pp. 46–47.*
IBM Technical Bulletin TDB 07–74, pp. 348–350. *Automated, Command Descriptor Structure Generation*. Jul. 1974.

* cited by examiner

*Primary Examiner*—St. John Courtenay, III
(74) *Attorney, Agent, or Firm*—Jeffrey S. LaBaw; Bracewell & Patterson, L.L.P.

(57) ABSTRACT

A logical device that is coupled to a computer can be controlled using string commands. The logical device requires flags and a data structure to operate properly. A string command with tokens for operating a specific logical device is provided. A linked list of the tokens is created. A command table for the specified logical device is found. The command table contains possible commands for the logical device, which commands are able to provide the required flags and data structure for the logical device. Each command in the command table contains key words or tokens or multiword tokens. The command table tokens are parsed, one at a time, against the command string tokens. If no match between the command table token and a command string token occurs, then the next command table token is parsed against the command string tokens. If a match between a command table token and a command string token occurs, then the flag that is associated with the command string token is provided and data from either the command string token or the command table token is inserted into the data structure in its proper place.

20 Claims, 6 Drawing Sheets

STRING COMMAND PARSER FOR MESSAGE BASED SYSTEMS

TECHNICAL FIELD OF THE INVENTION

The present invention relates to methods and apparatuses for interfacing with logical device drivers of various types with a computer.

BACKGROUND OF THE INVENTION

Computers are frequently called upon to work with a variety of devices. For example, when a multimedia presentation is made by a computer, the computer may be connected to multimedia output logical devices such as compact discs (either audio or video), a laser disc, an amplifier or a mixer. In addition to presenting data to output logical devices, the computer may be utilized to record and edit multimedia data obtained from a variety of input logical devices, such as the computer's hard disk memory or MIDI (musical instrument digital interface) data.

The logical devices that the computer works with require different data structures and commands. A software system is used by a computer to interface with a logical device. It is desirable to utilize a single software system to work with all or most of the available logical devices. This simplifies the interfacing from a computer user's point of view, as only one software system need be learned. In addition, a single software system for all of the logical devices provides flexibility and performance advantages over a software system for each logical device.

Of course, it is also desirable for such a software system to be commercially successful. One factor that determines whether a particular software system commercially succeeds is the base of applications and users for that software system. The faster and easier that applications can be written for a software system, and the easier that users (such as programmers) can learn the software system, then the more successful the system will be.

The acceptance of a software system by users is limited by its type of interface. In the prior art, two types of interfaces are a procedural interface and a string interface. A strictly procedural interface requires use of a language which the logical devices can understand. This type of "machine" language is difficult for a human to understand. However, a procedural interface provides more options to a user because full use of a variety of logical devices is provided for.

A string interface on the other hand uses strings of words or text which is more easily understood by humans. Thus, a string interface provides ease of use in programming. However, a string interface provides limited options in that the full use of a variety of logical devices is not provided for.

The driver for each logical device could implement both a procedural and a string interface. As a practical matter, this is undesirable because such an implementation becomes prohibitively expensive in terms of subsystem development.

There is in the prior art a software system that merges the best of both string and procedural interfaces for multimedia devices. This software system is referred to as Multimedia Presentation Manager/2 for OS/2 (MMPM/2) and is commercially available from IBM (International Business Machines Corporation). The MMPM/2 software system utilizes a string language to provide command and data inputs. A command table of available commands is also provided. A user provides a command input string for a specified device. Parsing of the command table occurs with the command input string serving as the parsing source. Thus, each entry in the command input string is parsed against the various entries in the command table.

The use of string commands allows users to program using a string language that is common to all multimedia devices supported by the MMPM/2 software system. Users are shielded from the differences in the procedural data structures of the different devices.

The present invention provides improvements to the MMPM/2 software system by changing the parsing method. The improvements allow for efficient use of multiword string tokens in the command input strings and provide a more efficient parsing when no errors are found.

SUMMARY OF THE INVENTION

It is an object of the present invention to provide a method and apparatus that provides more efficient parsing of command input strings.

The method and apparatus of the present invention provide a command from a computer to a logical device that is connected to the computer. A command string containing the command is provided. A command structure for use with the command is built. The command structure has an information structure that can be utilized by the logical device. Information from the string is inserted into the information structure by parsing the command structure against the string.

In one aspect of the present invention, the command structure includes a data structure and one or more flags. The insertion of information from the string into the information structure includes the insertion of data from the string into the data structure. In another aspect of the present invention, the flags and data structure are passed from the computer to the logical device.

The information provided by the command string is converted into the command structure, so that the logical device can use the information. The command structure for a logical device typically includes flags and a data structure. The parser allocates the data structure which comprises number and size of data words that is required by the logical device. In addition, the data structure presents the data in the order that is expected by the logical device.

The present invention shields the user from the different data structures and flags that are required by different logical devices, so that the user need not be concerned with satisfying the peculiarities of a particular logical device. Instead, the user provides a command string that specifies the logical device, the desired command, and the necessary data. The present invention builds a linked list of tokens or keywords from the command string. Then, a command table for the specified logical device is found from memory. The command table contains plural commands for the specified logical device. Each command is capable of building the required data structure and providing the required flags to operate the specified logical device. Each command typically contains numerous keywords or tokens, such as wait, notify, etc. in order to satisfy all of the possible command strings. The command string is likely to contain only a few of the keywords in the command that is located in the command table. Thus, the command keywords are parsed, one at a time, against the command string, looking for matches. If no match between a command table keyword and a command string keyword is found, then the next command table keyword is parsed against the command string. If a match is found between the command table keyword and a command string keyword, the flag and data specified by the command table keyword and the matched command string keyword are inserted into the information structure that is to be passed to the logical device. The data for the data structure is obtained either from the command string or from the command table itself.

The present invention provides for more efficient parsing than in the prior art, especially when multiword string tokens are provided in the command string. A multiword token contained in the command table is more easily parsed against the command string than vice versa. This is especially true when keywords are used in multiple tokens. Parsing a multiword keyword contained in a command string against a command table leads to confusion and error, as specificity is difficult to accomplish against multiple occurrences of the same keyword in a command table.

Because the command table is used as the parsing source, great flexibility is achieved. The command table can be changed to provide a different look and feel to the data structure. Thus, if a new logical device is invented and connected to a computer, its required information structure can be easily accommodated by either editing the existing command tables, or creating a new command table. In addition, the overall parsing method can be changed by changing the command table. For example, in the specification that follows, the multimedia logical devices require 32 bit words. However, if a logical device requires 16 bit words, then the command table can be easily changed to accommodate this requirement.

DESCRIPTION OF THE INVENTION

Figure 1:
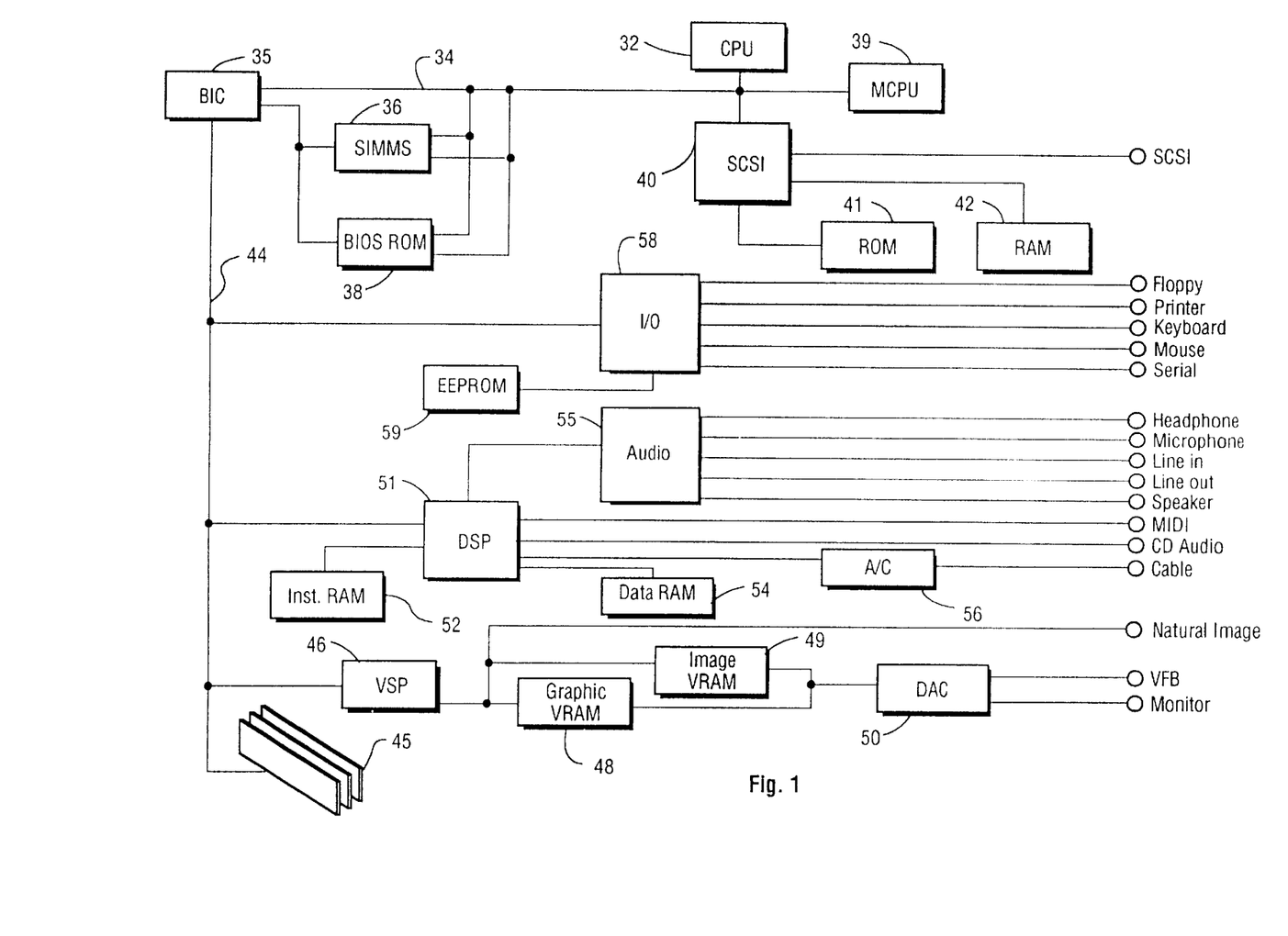
FIG. 1 is a schematic view of certain components of a computer on which the present invention can be practiced.

The present invention is utilized on a computer or data processing system, such as is shown in FIG. 1. The type of computer shown in FIG. 1 is a personal computer, which utilizes a microprocessor as a central processing unit (CPU) 32. While any appropriate microprocessor can be used as the CPU 32, one suitable microprocessor is the 80386 which is sold by INTEL. The CPU 32 is connected by a high speed CPU local bus 34 to a bus interface control unit (BIC) 35, to volatile random access memory (RAM) 36 here shown as Single Inline Memory Modules (SIMMs) and to BIOS ROM 38 in which is stored instructions for basic input/output operations (BIOS) to the CPU 32. The BIOS ROM 38 includes the BIOS that is used to interface between the I/O devices and the operating system of the CPU 32. Instructions stored in the BIOS ROM 38 can be copied into RAM 36 to decrease the execution time of BIOS.

While the present invention is described with reference to the system block diagram of FIG. 1, it is to be understood at the outset of the description which follows that it is contemplated that the apparatus and methods in accordance with the present invention may be used with other hardware configurations. For example, the system processor could be an Intel 80486 microprocessor.

Returning now to FIG. 1, the CPU local bus 34 (comprising data, address and control components) also provides for the connection of the CPU 32 with a numeric or math coprocessor 39 and a Small Computer Systems Interface (SCSI) controller 40. The SCSI controller 40 may, as is known to persons skilled in the arts of computer design and operation, be connected or connectable with Read Only Memory (ROM) 41, RAM 42, and suitable external devices of a variety of types as facilitated by the I/O connection indicated to the right in the Figure. The SCSI controller 40 functions as a storage controller in controlling storage memory devices such as fixed or removable media electromagnetic storage devices (also known as hard and floppy disk drives), electro-optical, tape and other storage devices. Digital audio playback and recording can occur on a hard disk or other memory (referred to as waveaudio).

The bus interface controller (BIC) 35 couples the CPU local bus 34 with an input/output (I/O) bus 44 and functions as a protocol translator, memory controller and DMA controller among other functions. By means of the bus 44, the BIC 35 is coupled with an optional feature bus such as a MICRO CHANNEL bus having a plurality of I/O slots for receiving MICRO CHANNEL adapter cards 45 which may be further connected to an I/O device or memory (not shown). The I/O bus 44 includes address, data, and control components. The I/O bus 44 may be configured to bus specifications other than the MICRO CHANNEL specification.

Coupled along with the I/O bus 44 are a variety of I/O components such as a video signal processor (VSP) 46 which is associated with video RAM (VRAM) for storing character based information (indicated at 48) and for storing graphic or image based information (indicated at 49). Video signals exchanged with the processor 46 may be passed through a Digital to Analog Converter (DAC) 50 to a monitor or other display device. Provision is also made for connecting the VSP 46 directly with what is here referred to as a natural image input/output, which may take the form of a video recorder/player, camera, etc. The I/O bus 44 is also coupled with a Digital Signal Processor (DSP) 51 which has associated instruction RAM 52 and data RAM 54 available to store software instructions for the processing of signals by the DSP 51 and data involved in such processing. The DSP 51 provides for processing of audio inputs and outputs (such as are provided by a headphone, a microphone, a speaker, etc.) by the provision of an audio controller 55, and for handling of other signals (such as provided by a cable) by provision of an analog interface controller 56. In addition the DSP 51 provides for processing inputs from logical devices such as a musical instrument digital interface (MIDI) (referred to as sequencer). Other logical devices, such as an audio compact disc (referred to as cdaudio), a video compact disc (cdxa), a laser video disc (videodisc) and amplifiers and mixers (ampmix) can be connected to the I/O bus 44 either directly or through the VSP 46 or DSP 51.

Lastly, the I/O bus 44 is coupled with an input/output controller 58 with associated Electrical Erasable Programmable Read Only Memory (EEPROM) 59 by which inputs and outputs are exchanged with conventional peripherals including floppy disk drives, a printer or plotter, keyboard, a mouse or pointing device, and by means of a serial port.

In the embodiment that is described and illustrated herein, the specific logical devices are multimedia devices (e.g.

waveaudio, sequencer, ampmix, cdaudio, videodisc and cdxa). However, the invention is not limited to multimedia devices and can be used with any other organization of devices or objects. Also, although certain aspects of the present invention are described hereinafter with respect to C programming language, the invention can be implemented in other programming languages as well.

Before the specifics of the invention are described, an example will be given. Suppose a user provides the following command string:

play cdaudio from 3000 to 6000 wait.

The command string is meant to play a segment of data from a CD—ROM logical device. The segment of data is digital audio data and is located between 3000 and 6000 units (any type of units may be specified) on the cdaudio logical device. After playing the segment, the logical device waits, or stops. Thus, if the command string is implemented, a user of the computer would hear a short segment of audio from one or more speakers.

The above command string can be one line of a larger program that controls various logical devices over various periods of time. Therefore, the user may hear or see information presented before, during or after the short segment of audio from the cdaudio logical device.

The cdaudio logical device requires a particular data structure in order to execute the play command. The data structure specifies the type, the amount and the order of data. To properly drive the cdaudio device with the play command, the data must be passed to the logical device in accordance with the required data structure. The present invention converts the string command into the particular data structure that is required by the cdaudio device. The structural data is then passed to the logical device. In addition, flags contained within the string command are passed to the logical device.

A similar string command can be used for other logical devices. For example, to play a segment of data from a laser disc, the following command is utilized: play videodisc from 2000 to 9000 wait. The videodisc command passes the data to the laser disc in accordance with the data structure that is required by the laser disc (which is likely to be different from the data structure required by the cdaudio device). Thus, the user needs fewer commands to control a variety of logical devices than with other types of interfaces. The present invention shields the user from the differences in the procedural data structures required by the different logical devices.

The simplicity of command string structure as seen by the user is made possible by the conversion process of the present invention. The command string is converted into the required data structure by parsing the command string against command table entries. The command table defines the required data structure. There is a command table for each device, which contains all of the commands for the logical device.

The string parser of the present invention operates in three steps. The first step is to use the command string to build a linked list of tokens. The tokens contain keywords that are used to match keywords in a command table.

The second step is to find the correct command table and build the data structure for the device command. In a command string, the first two elements or tokens provide information based on their positions in the string. The first element specifies the command, while the second element specifies the logical device. In the example given above, play is the command, while the logical device is cdaudio. Thus, the command table for the cdaudio device is located and the play command portion is found within the command table. Once located, the command table portion is used to build the correct data structure for the device command.

The third step parses the command string tokens against the command table. If a match between the command string token and a command table token is encountered, then the data structure and flags are filled in according to the command specifications.

Once the data structure has been filled in and flags provided, the data and flags are communicated to the specified logical device over a bus or other communications link. Return information may be provided by the logical device to the computer.

Figure 2:
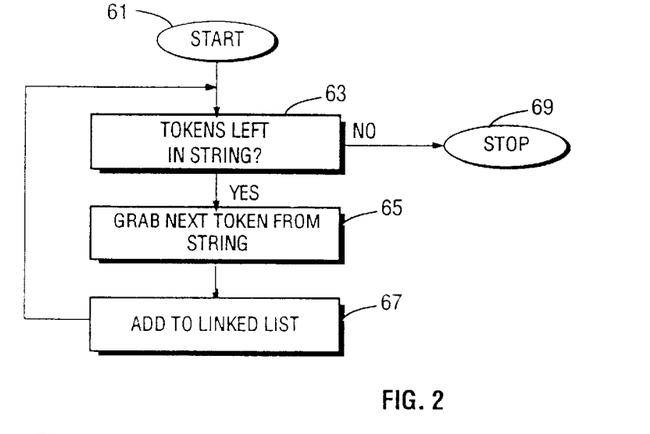
FIGS. 2 and 3 are flow charts showing the methods for tokenizing the command string.
Figure 3:
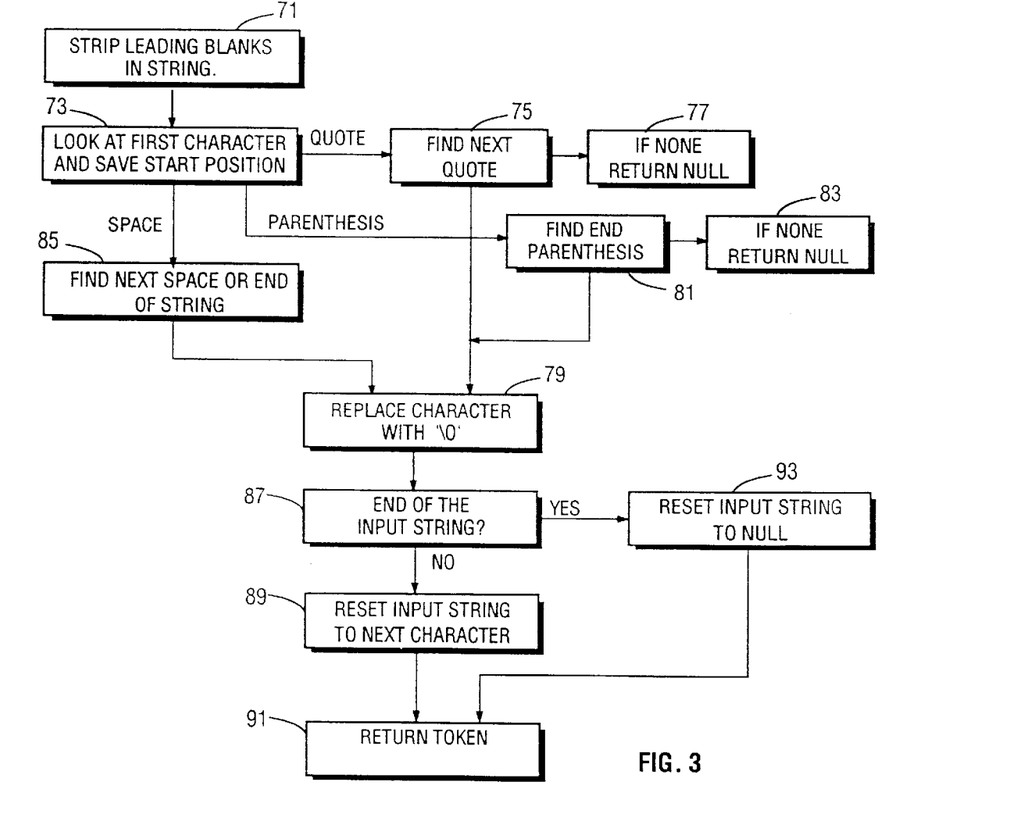

Now the specifics of the parsing steps will be described. The first step is utilizing the command string to build a linked list of tokens. In FIGS. 2 and 3, there are shown flow charts of methods for providing a tokenized structure list from the command string. The method of FIG. 2 builds the linked list of tokens, while the method of FIG. 3 identifies the individual tokens contained within the command string.

Referring to FIG. 2, the method is started, step 61. The method of FIG. 2 can be started, for example, by a user typing the command string and then pressing an ENTER key on a keyboard. Alternatively, where plural command strings are to be processed, the method of FIG. 2 is automatically started on a command string by command string basis. The command string is provided in the form of an ASCIIZ string (where the last character of the string is zero). In step 63, the method determines if there are any tokens left in the command string. If the result of step 63 is YES, as in the case of processing the command string for the first time, then the method proceeds to step 65 In step 65 the method grabs the next (or first) token from the command string.

The next token is grabbed using the method of FIG. 3, which looks for token delimiters. Delimiters are used to identify tokens contained within the command string. In the preferred embodiment, the following delimiters are used: spaces, quotation marks and parentheses. Spaces are the default separators. The play example given above uses spaces between the tokens or keywords. Quotation marks are used to set off a string, while the quotation marks themselves are not included in the token. Parentheses are also used to set off a string, but the parentheses are included in the token. Parentheses allow for the grouping of information, for example as used by the MMPM/2 group command. One could issue a command such as "group grp 1 make (waveaudio cdaudio) wait" which would combine the waveaudio device and the cdaudio device under the alias grp 1. Subsequent commands to grp 1, like "play grp 1 notify", would result in each device in the group receiving the play command.

The ASCIIZ string is provided as an input to the method of FIG. 3. The method of FIG. 3 searches the input string for the first (or next) token, using the delimiters to identify the beginning and end of the token. When one delimiter is found (indicating the beginning of a token), the method searches for the second delimiter of the same type (that is a space, quotation mark or a parenthesis) to find the end of the token. The method of FIG. 3 provides as an output the first token in the input string and a modified input string. The modified input string is the input string minus the first token. Thus, the token that was "grabbed" by the method of FIG. 3 is removed from the input string, so that on the next reiteration of the method of FIG. 3, the next token is "grabbed" from the new (and modified) input string. If the returned token is the last token on the input string, then the modified string that is output is NULL.

Now the specific steps of the method of FIG. 3 will be described. In step 71, the leading blanks of the input string are stripped off. In step 73, the first character of the input string is examined and the start position of the first character is saved. If the first character is quotation marks (or quotation mark), then the method proceeds to step 75, wherein the next quotation marks (that is, the trailing quotation marks of a set of quotation marks) are found. If the next quotation marks are not found, then NULL is returned, step 77. If the next quotation marks are found, then in step 79, the first character is replaced with a single '\0', which in C language is a NULL character.

If in step 73, the first character of the input string is a parenthesis (specifically an open parenthesis), then the method proceeds to step 81 to find the end parenthesis. If the end parenthesis is not found, then in step 83, NULL is returned. If the end parenthesis is found, then the method proceeds to step 79.

If in step 73, the first character of the input string is a space, then the method proceeds to step 85 to find the next space or the end of the string. After step 85, the method proceeds to step 79 to replace the first character with a NULL character.

After step 79, the method determines if the end of the input string (which may have been modified by past reiterations of the method of FIG. 3) has been reached, step 87. If the result of step 87 is NO, then in step 89, the input string is reset to the next character after either the next space found in step 85, the next quotation marks found in step 75 or the end parenthesis found in step 81. The token is returned, step 91. Thus, step 89 creates the modified string by deleting the token that was grabbed from the modified string. Thus, the next token is now the first token in the modified string, which modified string will be processed in the next iteration of the method of FIG. 3. If the result of step 87 is YES, then the input string is reset to NULL, step 93 and the token is returned, step 91.

Figure 5:
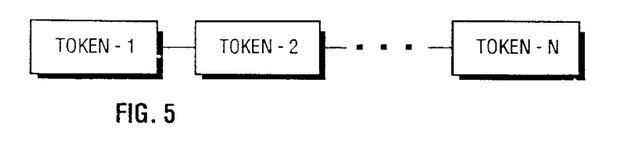
FIG. 5 is a schematic drawing of a command string with linked tokens, after having been processed by the methods of FIGS. 2 and 3.

The token is returned to step 65 with the method of FIG. 2. In step 67, the token is added to a linked list of tokens. The type definition structure of the linked list of tokens is a character string with the following variables: token size, a pointer to the token, a pointer to the previous token, and a pointer to the next token. The linked list of tokens for the command string is schematically shown in FIG. 5.

After step 67, the method returns to step 63 to determine if there are any tokens left in the string. The input string (which was modified by the method of FIG. 3) is examined for a NULL value. If the input string is not NULL, then the method proceeds to step 65, wherein the next token is grabbed with the method of FIG. 3. If the input string is NULL, then the method stops, step 69.

The second step of the present invention is to build a command structure. There is provided a command table library that contains plural command tables. There is a command table for each logical device. The command table contains plural commands for the logical device. Of course, if some command structures for two or more logical devices are the same, then the command table, or portions thereof, can be shared among logical devices. The command table library may be stored on hard disk or some other storage area or device.

Figure 4:
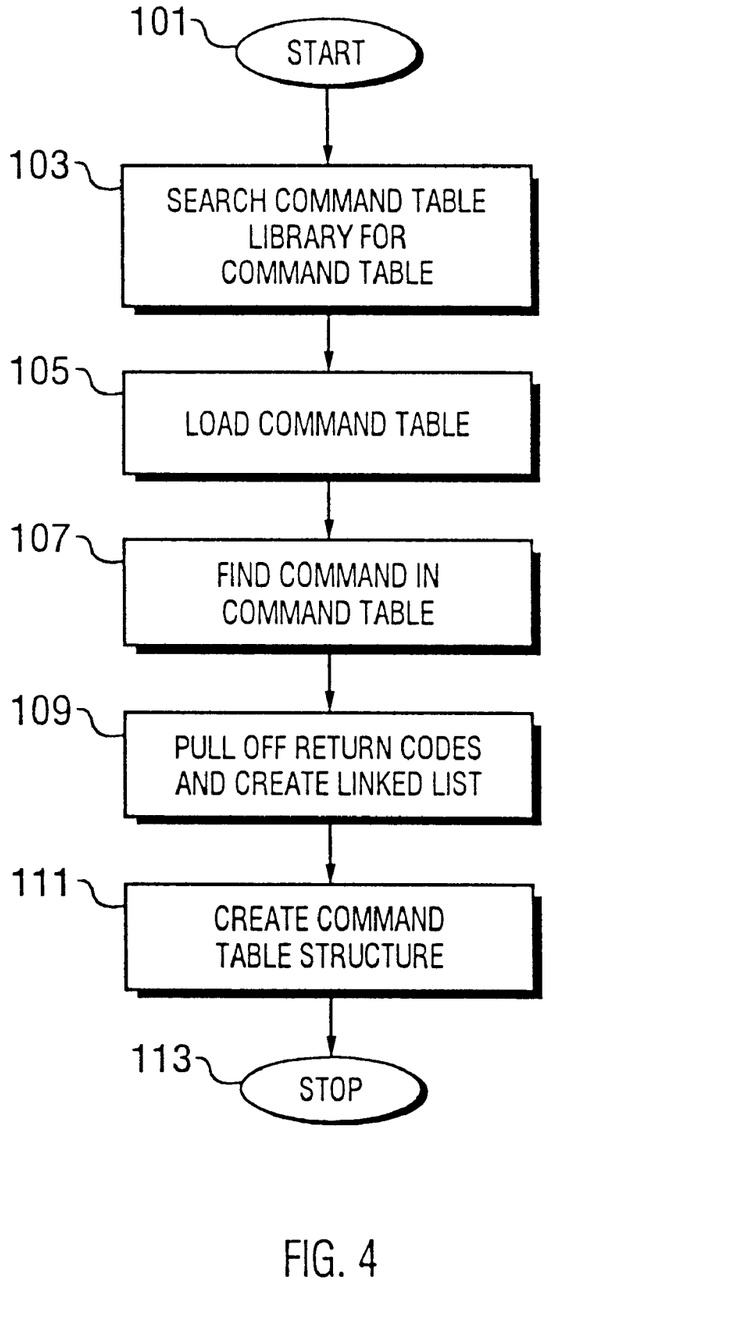
FIG. 4 is a flow chart showing a method for constructing a command table structure.

The method of FIG. 4 builds the required command structure for the specified logical device command. The method of FIG. 4 starts, step 101, and searches the command table library for the relevant command table, step 103. The second token in the command string linked list of tokens (created by the methods of FIGS. 2 and 3) is used to identify the relevant command table. The second token (cdaudio in the example) is used to find the command table for the specified logical device. Once the relevant command table has been found, its binary image is loaded into memory, step 105. In step 107, the command specified in the command string is found within the command table. The command is specified by the first token (play in the example given) in the command linked list of tokens. Each command in the command table is defined by a command block:

MCI COMMAND HEAD. . .

MCI END COMMAND.

Thus, step 107 searches for the command head and end command parameters.

once the specified command has been found, in step 109, the return code types are pulled from the command table. A linked list of return code type structures is created with the following type definition structures: the return code type, the previous token, the next token, the number of returns, a return code parameter and a pointer to a return string.

Return codes arise because the communication between a computer and a logical device is typically two way. When a command is sent to a logical device and a logical device executes the command, a return code may be sent from the logical device to the computer. For example, a return code may indicate that the logical device is ready (as opposed to currently being busy executing a command). The linked list of return code types created in step 109 allows the parser of the present invention to take a return code from a logical device and convert it into a string representation that is more easily understood by a human. For example, the return value might be 1 or 0, but the string that is presented to the user is respectively TRUE or FALSE.

After the return codes are pulled off, the remaining lines of the command table or block are command entries. A command table for the cdaudio play command is shown in Table 1.

TABLE 1

| Command Keyword String | Flag Value | Command Line Identifier |
|---|---|---|
| "play", | MCI_PLAY, 0, | MCI_CCMMAND_HEAD, |
| "notify", | MCI_NOTIFY, | MCI_FLAG, |
| "wait", | MCI_WAIT, | MCI_FLAG, |
| "from", | MCI_FROM, | MCI_INTEGER, |
| "to", | MCI_TO, | MCI_INTEGER, |
| "", | 0L, | MCI_END_COMMAND, |

Figure 6:
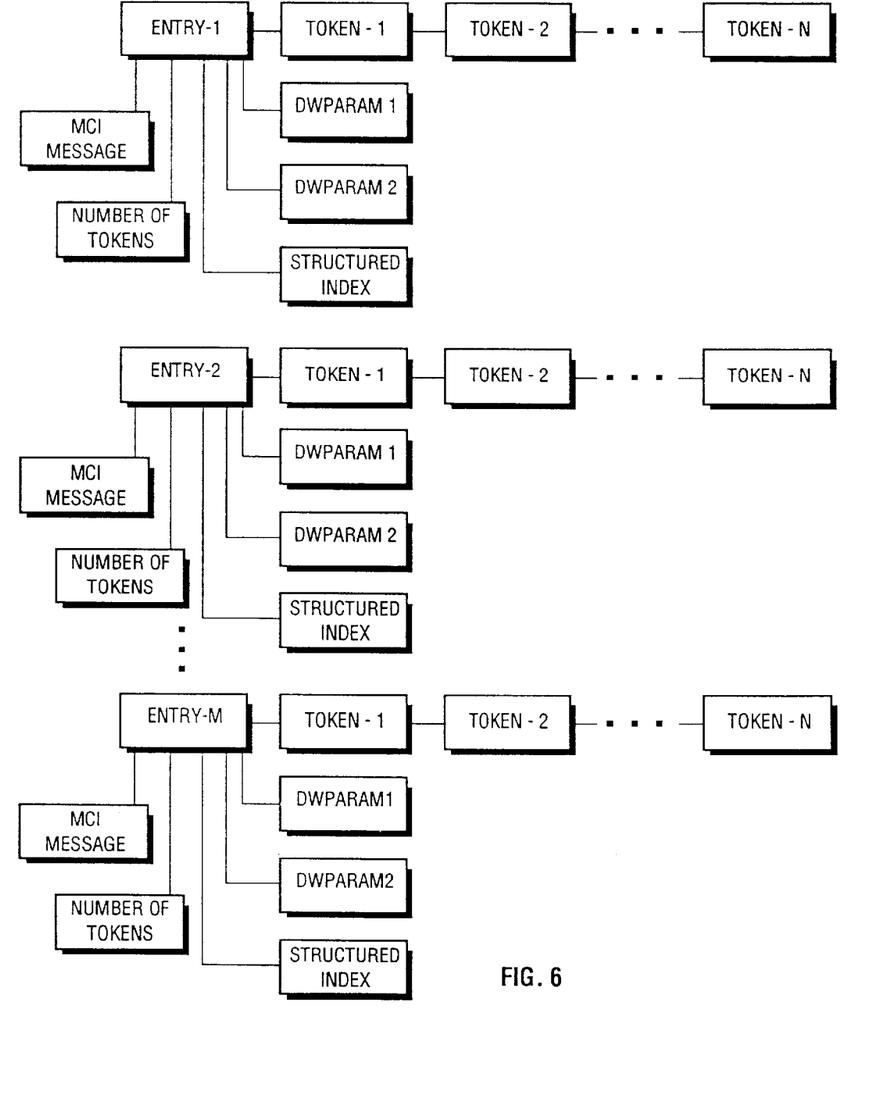
FIG. 6 is a schematic drawing showing a command table structure with m command entries, which command table structure is produced by the method of FIG. 4.

In the example, each element of the data structure is a 32 bit word. The value for MCI_PLAY is 16 bits, so a second 16 bit word is put next to it to provide a 32 bit word. In step 111, a command table structure is created and filled in. The command table structure is as shown in FIG. 6. The command table has m command entries, with each command entry having n tokens, a dwparam1 parameter (which is the flag value), a dwparam2 parameter (which may be an integer, a string, or in the case of nested commands, a dwparam1), a structure index parameter (which is the index number into the data structure where a value should go), a number of tokens parameter (which corresponds to n), and an MCI message parameter.

The tokens are single word strings linked together. Multiword strings are possible. For example, the multiword string "time format" has time (token-1) and format (token-2).

Table 2 provides the parameter structure for selected command line identifiers of the MCI type (which are used in conjunction with MMPM/2 for multimedia logical devices).

TABLE 2

| Command Line Identifier | dwParam1 FLAG VALUE | dwParam2 ULONG1 RECTL1 ITEM | ULONG2 RECTL2 VALUE | ULONG3 RECTL3 | ULONG4 RECTL4 |
|---|---|---|---|---|---|
| MCI_FLAG | dwParam1 | | | | |
| MCI_DEFAULT_STRING | dwParam1 | <def str> | | | |
| MCI_STRING | dwParam1 | <string> | | | |
| MCI_CONSTANT_STRING | dwParam1 | <string> | | | |
| MCI_CONSTANT_2 | dwParam1 | | | | |
| MCI_CONSTANT_STRING_PAIR | | dwParam1 | <string> | | |
| MCI_DEFAULT_INTEGER | dwParam1 | <def int> | | | |
| MCI_CONSTANT | dwParam1 | | | | |
| MCI_INTEGER | | dwParam1 | | | |
| MCI_CONSTANT_2 | dwParam1 | | | | |
| MCI_CONSTANT | | dwParam1 | | | |
| MCI_INTEGER | | | dwParam1 | | |
| MCI_INTEGER | dwParam1 | <integer> | | | |
| MCI_CONSTANT_INTEGER | | | | | |
| MCI_INTEGER | dwParam1 | <integer> | | | |
| MCI_CONSTANT_2 | dwParam1 | | | | |
| MCI_CONSTANT_INTEGER_PAIR | | dwParam1 | <string> | | |
| MCI_RECTL | dwParam1 | <integer> | <integer> | <integer> | <integer> |
| MCI_CONSTANT_4 | dwParam1 | | | | |
| MCI_RECTL | dwParam1 | <integer> | <integer> | <integer> | <integer> |
| MCI_CONSTANT_2 | dwParam1 | | | | |
| MCI_FOURCC | | dwParam1 | FOURCC val | | |
| %d | <integer> | | | | |
| MCI_STRING_LIST | dwParam1 | <pointer to array of pointers to strings in the list> | | | |

The command line identifiers (leftmost column) are associated with keywords or command tokens. The command line identifiers define the size of the data structure. The location of the data values is determined by the order of the command line identifiers and whether they are nested using a constant block. The play command table provided in Table 1 has several command line identifiers. MCI_COMMAND_HEAD and MCI_END_COMMAND define the beginning and end of the play command. MCI_FLAG is a flag value (dwparam1) with no data. MCI_INTEGER has a flag value (dwparam1) and data (dwparam2), which is one 32 bit word long. Another type of command line identifier is MCI_RECTL which has data that is 4–32 bit words long. MCI_RECTL provides a rectangular window. The upper left corner and the lower right corner of the window are each described by two words. The other command line identifiers will be described hereinafter.

After the command table structure has been established, then actual parsing of the command string against the command table can begin. The parsing method is shown in FIG. 7.

Figure 7:
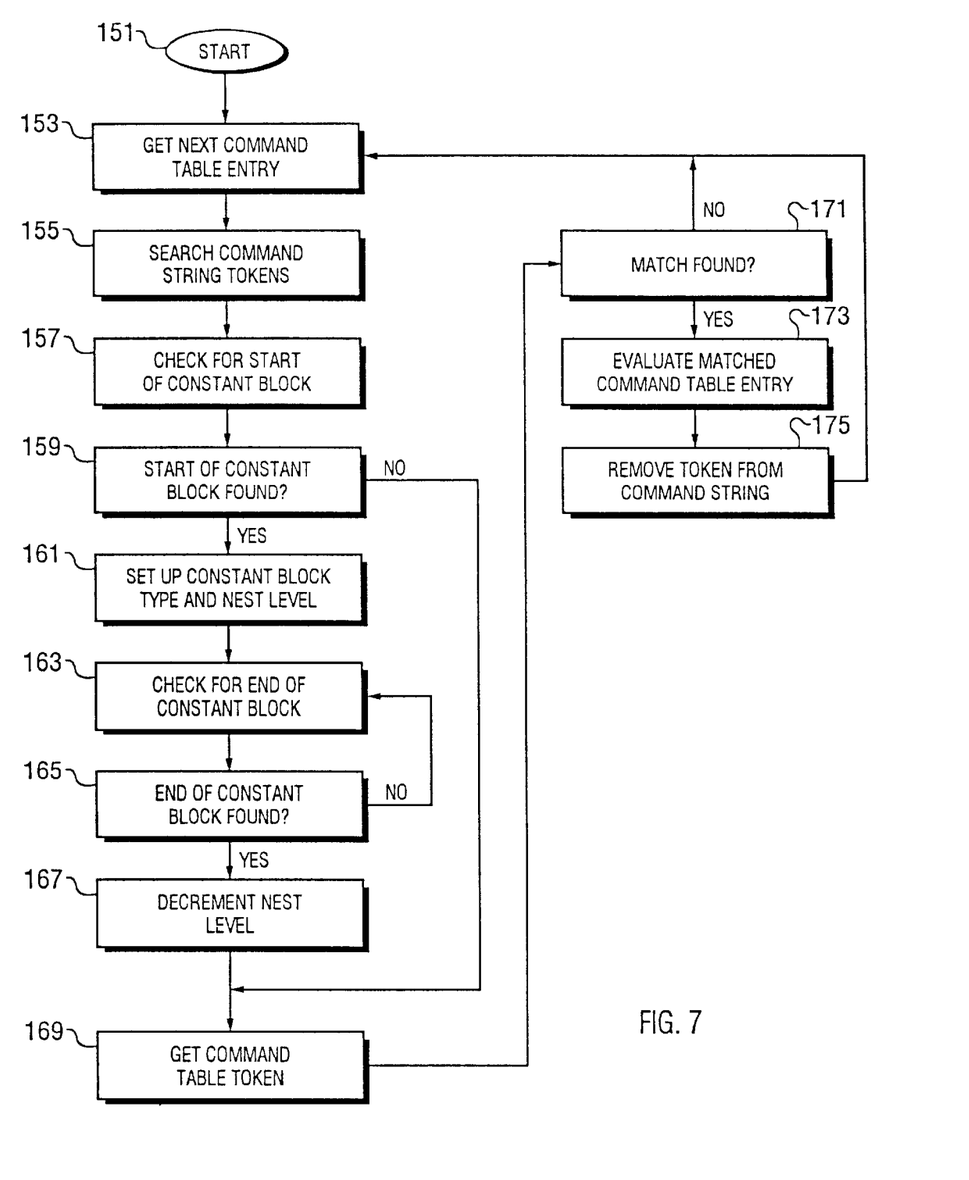
FIG. 7 is a flow chart showing the parsing of command string tokens with the command table structure.

The parsing method of FIG. 7 starts, step 151. The method loops through the command table entries, one by one. In step 153, the method gets the next (or first) command table entry (see FIG. 6). In step 155, the method searches through the command string tokens (see FIG. 5). In step 157, the method checks for the start of a constant block in the command string tokens. Constant blocks are used to provide data words to allow nesting or grouping of certain commands in order to achieve greater flexibility in operating a logical device. If the start of a constant block is found, step 159, then the method proceeds to step 161. In step 161, a constant block type and nest level are set up. In step 163, the method checks for the end of the constant block. If the end of a constant block is not found, step 165, then the method returns to step 163 to check for the end of the constant block. If the end of the constant block is found, then in step 167, the next level is decremented. After step 161, or if the result of step 159 is NO, then the method proceeds to step 169.

If the result of step 159 is NO, then the method proceeds to step 169. In step 169, the method gets the token from the command table entry. In step 171, the method determines if a match between the command table token and a token in the command string is found. If the result of step 171 is YES, a match is found, then the command table entry is evaluated and processed. Processing involves placing data in the data structure and ORing a flag value with a master flag value.

After a token in the command string has been matched with the command table, the token is removed from the command string, step 175. After step 175, the method gets the next command table entry, step 152. Likewise, if no match is found, step 171, the method gets the next command table entry, step 153.

The following are examples of command line identifiers and the processing of those identifiers that occurs in step 173:

MCI_FLAG —A check for a duplicate keyword is made. The flag value is logically OR'd with flags already located in a flag structure. Flag values are typically exponential values of 2, e.g. 1, 2, 4, 8, 16, 32, etc. The flag values are added together and the sum is passed to the logical device. The logical device is able to identify the specific flags that were sent to it from the sum, by working backwards and determining the respective integer values for the flags. The command string tokens are removed from the command string.

MCI_INTEGER —A check for a duplicate keyword is made. The integer value following the command string token is inserted into the data structure at the location indicated by the structure index. This is a simple array (or index) insertion, thereby making this step of parsing very efficient. The command string token (tokens) are removed from the command string.

MCI_CONSTANT or MCI_CONSTANT_PAIR —A check for a duplicate keyword is made. The constant block parameters are initialized. The command string tokens are then removed from the command string.

MCI_DEFAULT_STRING —A check for a duplicate keyword is made. Also, a check for one more token left in the command string is made. An error is produced if no tokens are found. MCI_STRING and MCI_CONSTANT_STRING are the same as MCI_DEFAULT_STRING except that no check for a single token left in the command string is made.

MCI_STRINGLIST —A check for a duplicate keyword is made. An array of pointers to point to strings in the specified list is created. The pointer list is filled in and the string list tokens are removed from the command string.

MCI_INTEGER contained in a constant block CONSTANT_2 —The data value is obtained and inserted into the data structure. Then the flag value is OR'd with the master flag value. The command line identifier MCI_INTEGER in a constant block CONSTANT_INTEGER:INTEGER is the same.

MCI_RECTL —The next four values from the command string are obtained. These values are validated. The values (tokens) are then removed from the command string.

MCI_INTEGER contained in an MCI_CONSTANT_INTEGER block —An error check for a duplicate keyword is first made. The keyword token associated with the MCI_CONSTANT_INTEGER is removed from the command string and the next token is taken as an MCI_INTEGER, where the integer following the command string token is inserted into the data structure at the location indicated by the structure index.

MCI_CONSTANT_INTEGER_PAIR —A check is made for a duplicate keyword. If this command line identifier is within a MCI_CONSTANT_2 block, then the flag value is OR'd with the master flag value and the data value is obtained and inserted into the data structure.

MCI_CONSTANT_STRING_PAIR —A check is made for a duplicate keyword. If this command line identifier is contained within a MCI_CONSTANT !_2 block, then the next command string token is obtained, the string pointer is inserted into the data structure and the command string token or tokens are removed.

MCI_FOURCC —A check is made for a duplicate keyword. If this identifier is contained within an MCI_CONSTANT_2 block, then the next command string token is obtained, the token is converted to a "FOURCC" value which is inserted into the data structure and the command string tokens are removed.

MCI_DEFAULT_INTEGER —A check is made for any tokens left in the command string. If none are found, then an error is produced. The command string token is removed and if any command string tokens are left, then an error is returned.

Referring now to the example: play cdaudio from 3000 to 6000 wait, the various steps of the parser will be described.

Figure 8:
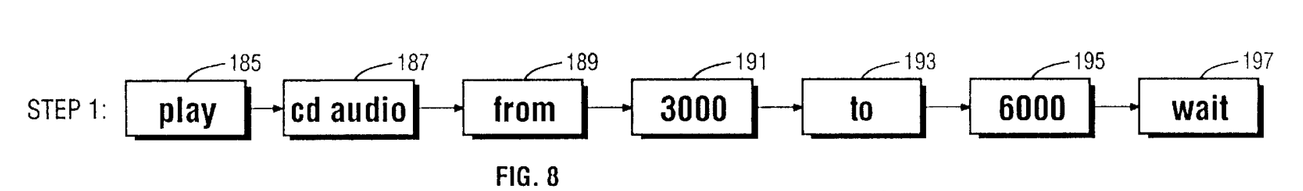
FIGS. 8–10 illustrate an example.

The first step is to build a linked list of the command string tokens 185–197 or keywords. The linked list of the example command string is shown in FIG. 8.

Figure 9:
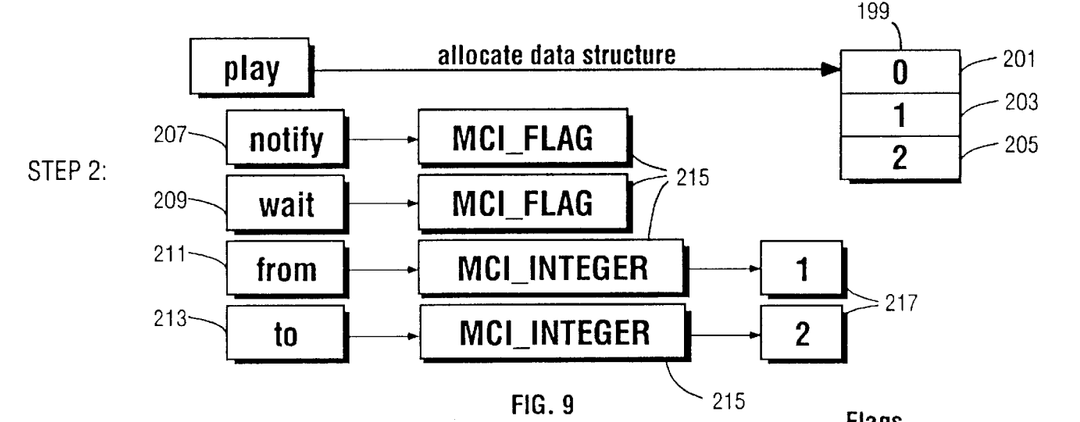

The second step is to find and utilize the command table for the cdaudio logical device and the play command. The command table for the play command on a cdaudio logical device is shown in Table 1 above. The structure for the play command is shown in FIG. 9. The data structure 199 for the play command has 3–32 bit words. The first word 201 is used as a callback address. The second word 203 contains a starting location of the audio logical device, while the third word 205 contains the end location of the audio data. The play command has four entries, each of which has a single word token. The tokens for the entries are "notify" 207, "wait" 209, "from" 211 and "to" 213. The dwparam2 values are shown at 215. The structure index for "from" and "to" are shown at 217 and indicates that the data for the "from" token goes into the data word 203, while the data form the "to" keyword goes into the data word 205.

Figure 10:
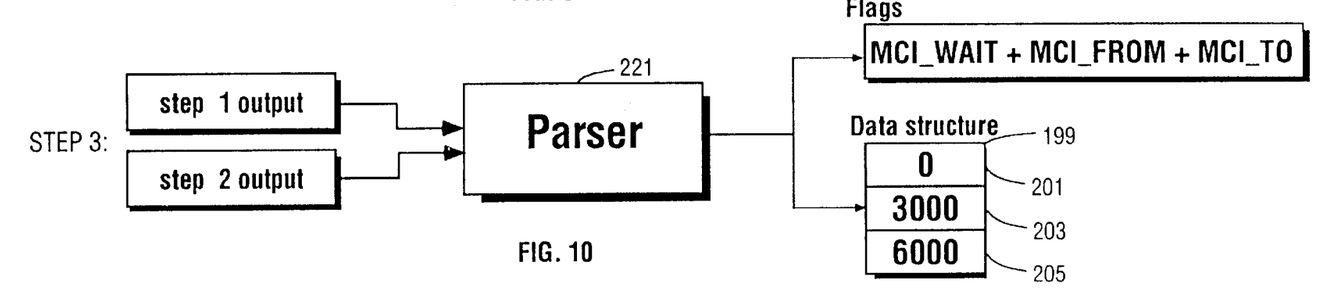

The third step is to parse each entry of the command table against the command string tokens (see FIG. 10). The parser 221 walks through the command table one entry at a time. The first entry token is "notify" 207. As the command string tokens 185–197 of FIG. 8 do not contain "notify", there is no match. The next entry token that is parsed is "wait" 209. A match is found between the command table entry token 209 and the command string token 197. Because the "wait" entry contains no data, the only operation that is performed is to OR the flag value MCI_WAIT (see Table 1) with the master flag, as shown in FIG. 10. The "wait" token 197 is deleted from the command string list. The next match is the "from" token 189. The parser ORs the MCI_FROM flag value with the master flag value and inserts the specified data into the data structure at 203. The next token 191 in the command string, "3000", is converted into a 32 bit integer before being placed into the data structure. Both tokens "from" and "30001" are removed from the linked list of the command string. The final token match is found in "to" 193. The MCI_TO flag value is OR'd with the master flag value and the data "6000" is placed into the third word 205, as shown in FIG. 10.

The present invention allows the use of multiword tokens as shown in Table 3. The word "position" is used in multiple keywords, namely "position in track" and "position". Also, the word "track" is used in multiple keywords, namely "current track" and "position in track". Because parsing is done from the command table against the command string, efficient, error free parsing is provided. For example, a command string of: status cdaudio "position in track" 5 is parsed without any ambiguity. The flag value and data structure as specified by "position in track" is matched against the command string. The keyword "position" is ignored and thus its flag value and data structure is also ignored.

The foregoing disclosure and the showings made in the drawings are merely illustrative of the principles of this invention and are not to be interpreted in a limiting sense.

TABLE 3

| Command Keyword String | Flag Value | Command Line Identifier |
|---|---|---|
| "status", | MCI_STATUS, 0, | MCI_COMMAND_HEAD, |
| "", | MCI_INTEGER, | MCI_RETURN, |
| "notify", | MCI_NOTIFY, | MCI_FLAG, |
| "wait", | MCI_WAIT, | MCI_FLAG, |
| "start", | MCI_STATUS_START, | MCI_FLAG, |
| "", | MCI_STATUS_ITEM, | MCI_CONSTANT, |
| "mode", | MCI_STATUS_MODE, | MCI_INTEGER, |

TABLE 3-continued

| Command Keyword String | Flag Value | Command Line Identifier |
| --- | --- | --- |
| "ready", | MCI_STATUS_READY, | MCI_INTEGER, |
| "number of tracks", | MCI_STATUS_NUMBER OF TRACKS, | MCI_INTEGER, |
| "position in track", | MCI_STATUS_POSITION_IN_TRACK, | MCI_INTEGER, |
| "position", | MCI_STATUS_POSITION, | MCI_INTEGER, |
| "volume", | MCI_STATUS_VOLUME, | MCI_INTEGER, |
| "", | OL, | MCI_END_CONSTANT, |
| "", | OL, | MCI_OR, |
| "track", | MCI_TRACK, | MCI_INTEGER, |
| "", | OL, | MCI_END_COMMAND, |

What we claim is:

1. A method of sending a command from a first program running on a computer to a second program controlling a logical device that is connected to said computer, with said command being executed by said logical device, said method being implemented on said computer, comprising the steps of:

a) providing a command string containing said command;
   b) building a command structure for use with said command, said command structure indicating an information structure that can be utilized by said logical device, said information structure including a data structure and a flag portion; and
   c) parsing said command structure with reference to said command string, said step of parsing including the step of inserting data from said command string into said data structure and the step of inserting at least one flag into said flag portion of said information structure.

2. The method of claim 1, and further comprising the step of passing said flag portion and said data structure from said computer to said logical device.

3. The method of claim 1, said command string comprising tokens, wherein said method further comprises the step of building a linked list of said tokens.

4. The method of claim 3, said command string including a first command, wherein:

a) said step of building a command structure for use with said command further comprises the step of building a command structure with plural possible second commands, with each of said second commands comprising a token; and
   b) said step of parsing further comprises the step of searching said linked list of tokens for a match with a first one of said possible second commands and then with each subsequent possible second command in said command structure, and if a match is found, then inserting information associated with said matched second command into said information structure in accordance with each respective matched second command.

5. The method of claim 4, wherein said string comprises a multiword string token.

6. The method of claim 1, wherein said computer is connected to plural logical devices, wherein:

(a) said step of providing a command string containing said command further comprises the step of providing a command string identifying the particular logical device to which the command is to be passed; and
   (b) said step of building a command structure for use with said command further comprises the step of finding the appropriate command structure for the particular logical device.

7. The method of claim 1, wherein said step of providing a command string containing said command includes the step of providing a command string including a constant block that indicates that said command string includes at least a second command nested within a first command.

8. The apparatus of claim 7, wherein said means for parsing further comprises:

means for attempting to match each of said plurality of tokens within said command structure with an identical token in said textual string; and
   means, only responsive to a match, for processing a matched token in response to a command line identifier associated in said command structure with said matched token, wherein said means for processing includes said means for inserting information from said textual string and said flags into said information structure.

9. The method of claim 1, said method further comprising:

converting a return code supplied by said logical device in response to execution of said command into a string utilizing return code information supplied by said command structure.

10. An apparatus for sending a command from a first program running on a computer to a second program controlling a logical device that is connected to said computer, with said command being executed by said logical device, said apparatus comprising:

a) means for providing a command string containing said command;
   b) means for building a command structure for use with said command, said command structure indicating an information structure that can be utilized by said logical device, said information structure including a data structure and a flag portion; and
   c) means for parsing said command structure with reference to said command string, said means for parsing further comprising means for inserting data from said command string into said data structure and means for inserting at least one flag into said flag portion of said information structure.

11. The apparatus of claim 10, and further comprising means for passing said flags and said data structure from said computer to said logical device.

12. The apparatus of claim 10, said command string comprising tokens, wherein said apparatus further comprises means for building a linked list of said tokens.

13. The apparatus of claim 12, said command string including a first command, wherein:

a) said means for building a command structure for use with said command further comprises means for building a command structure with plural possible second commands, with each of said second commands comprising a token; and b) said means for parsing further comprises means for searching said linked list of tokens for a match with a first one of said possible second commands and then with each subsequent possible second command in said command structure, and if a match is found, then inserting information associated with said matched second command into said information structure in accordance with each respective matched second command.

14. The apparatus of claim 13, wherein said string comprises a multiword string token.

15. The apparatus of claim 10, wherein said computer is connected to plural logical devices, wherein:

(a) said means for providing a command string containing said command further comprises means for providing a command string identifying the particular logical device to which the command is to be passed; and (b) said means for building a command structure for use with said command further comprises means for finding the appropriate command structure for the particular logical device.

16. The apparatus of claim 10, wherein said means for providing a command string containing said command includes means for providing a command string including a constant block that indicates that said command string includes at least a second command nested within a first command.

17. The apparatus of claim 10, said apparatus further comprising:

means for converting a return code supplied by said logical device in response to execution of said command into a string utilizing return code information supplied by said command structure.

18. A method of sending a command from a first programming interface running on a computer to a second programming interface controlling a logical device that is connected to said computer, with said command being executed by said logical device, said method being implemented on said computer and comprising:

a) providing a textual string specifying both a command and a logical device that is to execute said command;

b) accessing a command structure in response to said command and said logical device, said command structure specifying an information structure that can be utilized by said logical device and a plurality of tokens that can validly be associated with said command in said textual string; and c) parsing said command structure with reference to said textual string, said step of parsing including the steps of inserting information from said textual string into said information structure, inserting at least one flag into said information structure, and passing said information structure from said computer to said logical device.

19. An apparatus for sending a command from a first program running on a computer to a second program controlling a logical device that is connected to said computer, with said command being executed by said logical device, said apparatus being implemented on said computer and comprising:

a) means for providing a textual string specifying both a command and a logical device that is to execute said command;

b) means for accessing a command structure in response to said command and said logical device, said command structure specifying an information structure that can be utilized by said logical device and a plurality of tokens that can validly be associated with said command in said textual string; and c) means for parsing said command structure with reference to said textual string, said means for parsing including means for inserting information from said textual string and at least one flag into said information structure and means for passing said information structure from said computer to said logical device.

20. The method of claim 19, wherein said step of parsing further comprises the steps of:

attempting to match each of said plurality of tokens within said command structure with an identical token in said textual string; and only in response to a match, processing a matched token in response to a command line identifier associated in said command structure with said matched token, wherein said processing step includes said step of inserting information from said textual string into said information structure and said step of inserting flags into said information structure.

* * * * *